(12) United States Patent
Prabhudeva

(10) Patent No.: US 10,405,152 B1
(45) Date of Patent: Sep. 3, 2019

(54) METHOD AND APPARATUS FOR VEHICULAR COMMUNICATION

(71) Applicant: Ford Global Technologies, LLC, Dearborn, MI (US)

(72) Inventor: Raghu Prabhudeva, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/928,571

(22) Filed: Mar. 22, 2018

(51) Int. Cl.
*H04W 4/23* (2018.01)
*H04W 4/40* (2018.01)
*H04W 4/06* (2009.01)
*H04L 29/08* (2006.01)
*H04W 84/12* (2009.01)
*H04W 4/80* (2018.01)

(52) U.S. Cl.
CPC ............ *H04W 4/23* (2018.02); *H04L 67/303* (2013.01); *H04W 4/06* (2013.01); *H04W 4/40* (2018.02); *H04W 4/80* (2018.02); *H04W 84/12* (2013.01)

(58) Field of Classification Search
CPC ........... H04W 4/23; H04W 4/40; H04W 4/06; H04W 84/18; H04W 84/20; H04W 84/22; H04W 12/009; H04W 4/42; H04W 4/44; H04W 4/46; H04W 4/48; H04W 88/00; H04W 88/02; H04W 88/04; H04W 80/02; H04W 80/04; H04W 80/06; H04W 4/14; H04W 4/18; H04W 4/70; H04W 4/80; H04W 28/021; H04W 28/0215; H04W 72/005; H04W 76/40; H04W 80/00; H04W 80/045; H04W 80/12; H04B 1/082; H04B 2201/71346; H04L 29/08; H04L 29/06; H04L 29/12962; H04L 61/6081; G10H 2240/321
See application file for complete search history.

(56) References Cited

U.S. PATENT DOCUMENTS

| | | | |
|---|---|---|---|
| 8,086,177 B2 * | 12/2011 | Trift et al. | .................... 455/41.2 |
| 8,885,875 B2 * | 11/2014 | Sako et al. | ......... H04N 21/4756 |
| 9,262,775 B2 | 2/2016 | LaMont | |
| 2004/0230373 A1 * | 11/2004 | Tzamaloukas | ................ 701/200 |
| 2008/0174414 A1 * | 7/2008 | McCarthy et al. | ......... 340/425.5 |
| 2010/0262987 A1 * | 10/2010 | Imanilov | ........................... 725/9 |
| 2011/0205040 A1 * | 8/2011 | Van Wiemeersch et al. | ............... 340/426.1 |
| 2011/0223937 A1 * | 9/2011 | Leppanen et al. | ......... 455/456.2 |
| 2013/0304795 A1 * | 11/2013 | Kang et al. | ............. H04L 67/10 |
| 2015/0298549 A1 * | 10/2015 | Tamura | .................. B60K 37/00 |
| 2016/0034495 A1 * | 2/2016 | Yano et al. | ....... G06F 17/30241 |
| 2016/0063561 A1 | 3/2016 | MacNeille et al. | |

(Continued)

FOREIGN PATENT DOCUMENTS

WO 2017151108 A1 9/2017

*Primary Examiner* — Meless N Zewdu
(74) *Attorney, Agent, or Firm* — Brooks Kushman P.C.

(57) ABSTRACT

A vehicle includes a controller that is configured to establish an ad-hoc network connection according to a first standard, establish a personal area network (PAN) connection with a nomadic device according to a second standard different than the first standard, and responsive to a topic of a broadcast received over the ad-hoc connection matching a profile defined according to internet browser history of the nomadic device, transfer the broadcast to the nomadic device via the PAN connection.

19 Claims, 4 Drawing Sheets

(56) References Cited

U.S. PATENT DOCUMENTS

| | | | |
|---|---|---|---|
| 2016/0097651 A1* | 4/2016 | Jung et al. | G01C 21/3667 |
| 2016/0183280 A1* | 6/2016 | Chow et al. | H04W 72/1205 |
| 2017/0148061 A1 | 5/2017 | Lei et al. | |
| 2018/0158256 A1* | 6/2018 | de Sa Miranda | G07C 5/008 |
| 2018/0315013 A1* | 11/2018 | Wilkinson et al. | G06Q 10/0832 |

\* cited by examiner

METHOD AND APPARATUS FOR VEHICULAR COMMUNICATION

TECHNICAL FIELD

This application is generally related to systems and methods to filter and route a dedicated short-range communications (DSRC) broadcast across a local area network.

BACKGROUND

Wireless communication is used to provide connectivity between individuals, entities, and a combination thereof. For example, cellular technology communication includes audio communication between two individuals, multiple individuals, and individuals and entities. Communication between individuals includes a standard cell phone call, while communication between multiple individuals includes conference calls, and communication between individuals and entities includes automated calls, robocalls, and telemarking. Video communication includes video messaging such as Skype, FaceTime, and WhatsApp, while data communication may include communication such as cellular home alarm system monitoring. Along with cellular technology, other wireless technology includes Wi-Fi (i.e., WiFi), Bluetooth®, ZigBee®, WiMAX™, IrDA®, NFC, etc. Wi-Fi is a wireless technology that can be used to create a local area network and is based on an IEEE standard 802.11, while Bluetooth® can be used to create a personal area network and is based on an IEEE standard 802.15.

SUMMARY

A vehicle includes a controller that is configured to establish an ad-hoc network connection according to a first standard, establish a personal area network (PAN) connection with a nomadic device according to a second standard different than the first standard, and responsive to a topic of a broadcast received over the ad-hoc connection matching a profile defined according to internet browser history of the nomadic device, transfer the broadcast to the nomadic device via the PAN connection.

A computer-implemented method for a vehicle includes establishing a first connection, a second connection with a nomadic device, and responsive to a match of a broadcast received over the first connection and a profile based on internet browser history of the nomadic device, routing the broadcast to the nomadic device. The first connection is in an ad hoc network according to a first standard and the second connection is with a nomadic device in a local area network according to a second standard, different than the first.

A vehicle includes a controller that may be configured to establish an ad-hoc network connection, a local area network (LAN) connection with a nomadic device, and responsive to a topic of a broadcast received over the ad-hoc connection matching a profile based on internet browser history of the nomadic device, display the broadcast in the vehicle and to the nomadic device via the LAN connection. Wherein the ad-hoc network connection is according to a first standard and the local area network (LAN) connection with a nomadic device is according to a second standard, different than the first.

DETAILED DESCRIPTION

Figure 1:
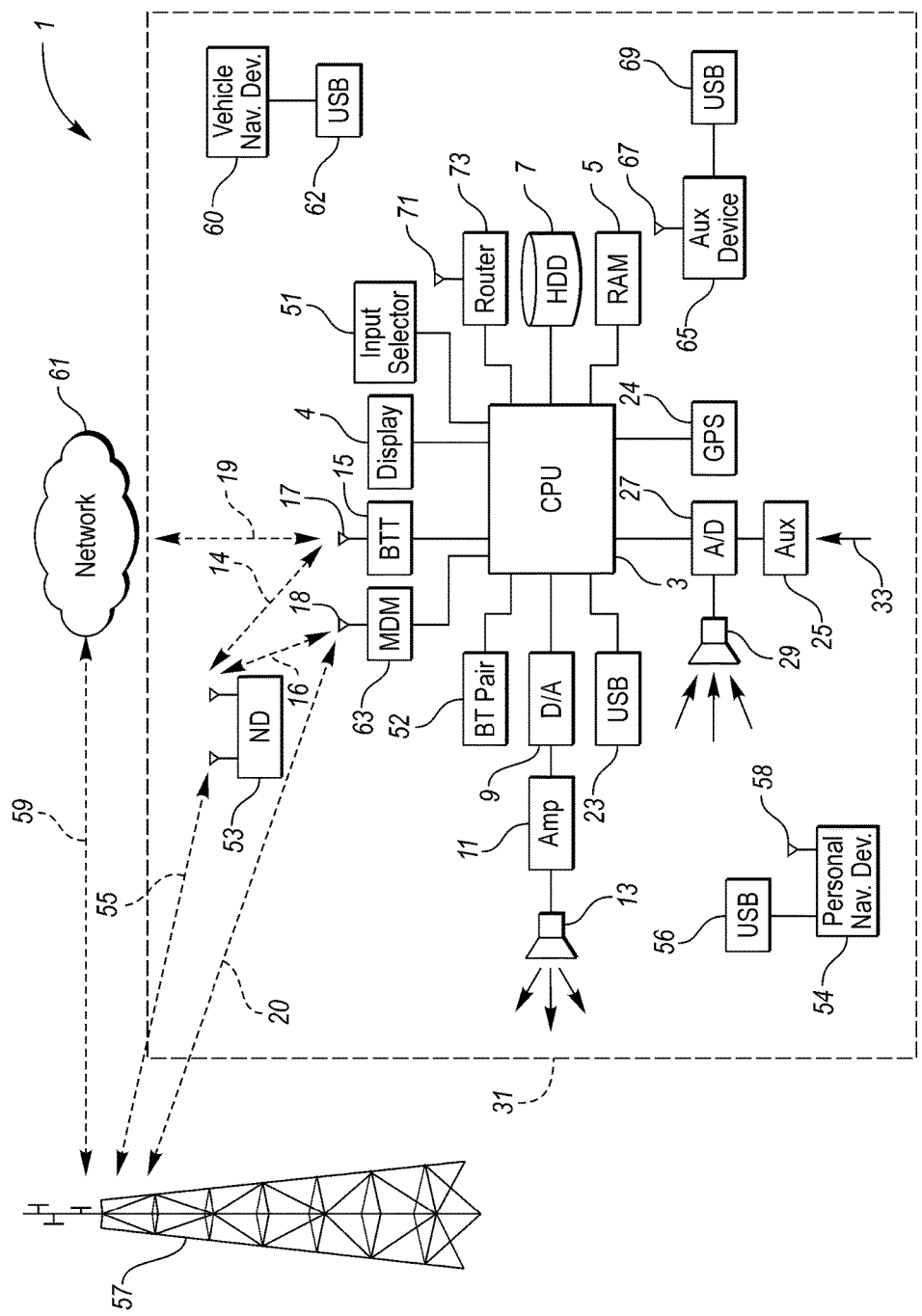
FIG. 1 is schematic diagram of a vehicle computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A Personal Area Network (PAN) is a network that covers a small area, (e.g., a small room, a passenger compartment of a vehicle, etc.). A common wireless PAN network technology is Bluetooth® (IEEE 802.15), and a common wired PAN is Universal Serial Bus (USB).

A Local Area Network (LAN) is a network that covers a local area, (e.g., an office, house, building, etc.). A common LAN network is Wi-Fi (IEEE 802.11), and a common wired LAN is Ethernet. Almost all wired and wireless modern LANs are based on Ethernet technology. Ethernet can be implemented via wired twisted-pair cables or wireless. Twisted pair cables plug into switches using RJ-45 connectors, wireless communication is under the IEEE 802.11 standard. Currently the IEEE 802.11 standard includes 802.11 b/g/n/ac standards in which IEEE 802.11b and g operate in the 2.4 Ghz spectrum, and n and ac operate in 2.4 and 5 Ghz spectrum. Although Wi-Fi is generally a LAN technology, is can be used in a PAN, but a PAN technology can-not support the distances needed to support a LAN.

A Wide Area Network (WAN) is a network that covers a large area (e.g., a network connecting multiple buildings in a municipality, on a corporate or college campus, up to connecting buildings and offices in different countries). A common WAN is the Internet which is a collection of other networks. WANs can be wired or wireless, a wired WAN may use convention conductive wire, fiber-optic cables, or a combination thereof. A wireless WAN might use electromagnetic waves including radio waves, microwaves, infrared (IR) waves, etc. A common wireless technology used in a WAN network is cellular technology, however Wi-Fi can also be used in a WAN.

Both cellular and Wi-Fi technologies utilizes frequencies in the electromagnetic spectrum. For example, a Global System for Mobile Communications (GSM) cellular phone may be operate at 850 MHz, 900 MHz, 1,800 MHz, or 1,900 MHz. Often the GSM phone is configured to support multiple bands, for example a three-band phone may communicate at 900 MHz, 1,800 MHz, and 1,900 MHz or 850 MHz, 1,800 MHz, and 1,900 MHz, while a four-band phone may be configured to communicate at 850 MHz, 900 MHz, 1,800 MHz, and 1,900 MHz. While the use of Wi-Fi as determined by the 802.11 workgroup has listed frequency ranges for communication, 2.4 GHz, 3.6 GHz, 4.9 GHz, 5 GHz, and 5.9 GHz. When speaking an operating frequency, often the center frequency is used as the naming frequency (e.g., 5 GHz) however the communication often occurs over a range of frequencies (e.g., U-NII-1 utilizes 5.150-5.250 GHz, and U-NII-2A utilizes 5.250-5.350 GHz) near the naming frequency. However, the most common Wi-Fi frequencies are the 2.4 GHz and 5.8 GHz (U-NII-3 5.725-5.850 GHz).

The standards for cellular technology include 2G/2.5G standards designated Global System for Mobile Communications (GSM) and related, (e.g., General Packet Radio Services (GPRS) and Enhanced Data rates for GSM Evolution (EDGE)), 3G standards designated Universal Mobile Telecommunications System (UMTS) and related (e.g., HSPA), 4G standards designated Long Term Evolution (LTE) and related (e.g., LTE Advanced and LTE Advanced Pro), 5G standards designated Next Generation and related standards, and other future cellular standards (e.g., IP Multimedia Subsystem (IMS), etc.) The standards for cellular technology may be locally regulated by organizations such as the Association of Radio Industries and Businesses (ARIB) in Japan, the Alliance for Telecommunications Industry Solutions (ATIS) in the USA, the China Communications Standards Association (CCSA) in China, the European Telecommunications Standards Institute (ETSI) in Europe, the Telecommunications Standards Development Society (TSDSI) in India, the Telecommunications Technology Association (TTA) in Korea, the Telecommunication Technology Committee (TTC) in Japan, or other country regulating authority. Cellular technologies in this document are based on ETSI standards as adopted by ATIS and other governing bodies.

Currently Wi-Fi frequencies are allocated in the 2.4 GHz and 5.8 GHz bands (i.e., U-NII-3 is in the range of 5.725-5.850 GHz). Another WAN wireless technology is Dedicated Short-Range Communication (DSRC) which utilizes IEEE 802.11p and has currently been assigned the frequency band above U-NII-3, (i.e., 5.850-5.925 GHz). It should be noted PAN technologies are a subset of LAN technologies, which are in turn a subset of WAN technologies.

Referring to DSRC, currently the IEEE 802.11p standard allocates channels of 10 MHz bandwidth in the 5.9 GHz band (5.850-5.925 GHz). In reference to 802.11a Wi-Fi, 802.11p is half the bandwidth, that is twice the transmission time for a specific data symbol. This change in channel bandwidth is such that the receiver is able to adjust for characteristics of the radio channel in vehicular communications environments, (e.g., signal echoes, reflections, and attenuation). IEEE 802.11p is an amendment to the IEEE 802.11 standard specifically for Wireless Access in Vehicular Environments (WAVE), that is a vehicular communication system. The 802.11p standard includes data exchange between vehicles and a roadside infrastructure, so called vehicle to vehicle (V2V) and vehicle to infrastructure (V2X) communication, in the licensed ITS band of 5.9 GHz (5.85-5.925 GHz). Another standard is IEEE 1609 that is a standard based on the IEEE 802.11p.

A vehicle controller such as a telematics unit, infotainment system, a vehicle computing system, or a gateway module is equipped with a mechanism to connect with multiple personal nomadic devices in the vehicle and an external network. These in-vehicle connections may be via a PAN such as Bluetooth®, NFC, inductive coupling, IrDA®, Wi-Fi, etc. Upon the connection being formed, a controller may receive a profile of the device user. The external connections may be via a WAN and may be structured as an ad-hoc network such as DSRC (e.g., 801.11p) The controller may then receive broadcasts over the WAN, filter the broadcasts according to multiple profiles, including a vehicle profile, and transmit the filtered broadcast to the respective device based on the respective profile.

One method of filtering, and thus generating the profile used to filter subsequent data streams, is the use of edge analytics. Edge analytics is an approach to data collection and analysis in which automated analytical computation is performed on data at a sensor, network switch, or other device. Basically, the controller performs the analysis at the point where data is being generated. It's about analyzing in real-time at the site the data is captured. The output of this analysis may then be stored as a profile and used to filter subsequent broadcasts.

Vehicle edge computing system may collate data of user preferences (both predefined and historical), location of the vehicle, time of day, day of the week, and other environmental factors. The system may then analyze the data in real-time and make recommendations for each user within the vehicle of unique offerings within the locality.

For example, a driver may want fuel prices when a low fuel tank warning is displayed. Likewise, a driver may want service station/air locations when a tire pressure monitoring system (TPMS) low tire pressure warning is being displayed. Also, the information may be used to create a filter to select appropriate DSRC data to assist the driver to find location. While for other passengers the filter may be an offer for food, shopping, local points of interest etc. The controller may use social media preferences and website browsing history to identify information of user preference and then tailor the filter of the DSRC broadcast. The social media history may include metrics of posting of images, likes, or swipes of locations, items, or articles.

An Edge Analytical model may distribute content/service/advertisement to users in vehicle based on user profile, preference, content viewing history, location etc. The model may take input of various services/content and output service/content suitable for user based on previous history, preference, linking etc. The model may be a probabilistic analysis for outputting behaviors that can be taken by the user, in response to input of various conditions relating to user attributes, preferences, history, etc.

FIG. 1 illustrates an example block topology for a vehicle based computing system 1 (VCS) for a vehicle 31. An example of such a vehicle-based computing system 1 (e.g., an infotainment system) is the SYNC system manufactured by THE FORD MOTOR COMPANY. A vehicle enabled with a vehicle-based computing system 31 may contain a visual front-end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment shown in FIG. 1, a processor 3 controls at least some portion of the operation of the vehicle-based computing system. Provided within the vehicle, the processor allows onboard processing of commands and routines. Further, the processor 3 is connected to both non-persistent storage 5 and persistent storage 7. In this illustrative embodiment, the non-persistent storage 5 is random access memory (RAM) and the persistent storage 7 is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor 3. In this illustrative embodiment, a microphone 29, an auxiliary input 25 (for input 33), a USB input 23, a GPS input 24, screen 4, which may be a touchscreen display, and a BLUETOOTH® input 15 are all provided. An input selector 51 is also provided, to allow a user to swap between various inputs. Input to both the microphone 29 and the auxiliary input 25 is converted from analog to digital by a converter 27 before being passed to the processor. Although not shown, numerous vehicle components and auxiliary components in communication with the VCS may use a vehicle network (such as, but not limited to, a Controller Area Network "CAN bus", and Ethernet bus, FlexRay bus, Local Interconnect Network "LIN bus" or other vehicle communication bus) to pass data to and from the VCS (or components thereof).

Outputs to the system 1 can include, but are not limited to, a visual display 4 and a speaker 13 or stereo system output. The speaker 13 is connected to an amplifier 11 and receives its signal from the processor 3 through a digital-to-analog converter 9. Output can also be transmitted to a remote BLUETOOTH® device such as PND 54 or a USB device such as vehicle navigation device 60 along the bi-directional data streams shown at 19 and 21 respectively.

In one illustrative embodiment, the system 1 uses the BLUETOOTH® transceiver 15 to communicate 17 with a user's nomadic device 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a Wi-Fi access point.

Exemplary communication between the nomadic device 53 and the BLUETOOTH® transceiver 15 is represented by signal 14.

Pairing the ND 53 and the BLUETOOTH® transceiver 15 can be instructed through a button 52 or similar input. Accordingly, the CPU is instructed that the onboard BLUETOOTH® transceiver will be paired with a BLUETOOTH® transceiver in a nomadic device.

Data may be communicated between CPU 3 and network 61 utilizing, for example, a data-plan, data over voice, or DTMF tones associated with the nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor 3 is provided with an operating system including an application programming interface (API) to communicate with modem application software. The modem application software may access an embedded software module or firmware on the BLUETOOTH® transceiver to complete wireless communication with a remote BLUETOOTH® transceiver (such as that found in a nomadic device). Bluetooth® is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA®) and non-standardized consumer IR protocols.

In another embodiment, the nomadic device 53 includes a modem for voice band or broadband data communication. In the data-over-voice embodiment, a technique known as frequency division multiplexing may be implemented when the owner of the nomadic device 53 can talk over the device 53 while data is being transferred. At other times, when the owner is not using the device 53, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the nomadic device 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH® transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless connection 67 or a wired connection 69. Auxiliary device 65 may include, but are not limited to, personal media players, wireless health devices, portable computers, and the like.

Also, or alternatively, the CPU 3 could be connected to a vehicle based wireless router 73, using for example a Wi-Fi (IEEE 803.11) 71 transceiver. This could allow the CPU 3 to connect to remote networks in range of the local router 73.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

A system and method performs filtering of an ad-hoc network broadcast (e.g., a dedicated short-range communications (DSRC) network broadcast) based on one or more user restrictions, user preferences, and/or user-specific attributes in a multiuser environment that presents and routes the broadcast to a user's nomadic device.

The system allows multi-user concurrent filtering of local advertised messages of the broadcast based on a user preference, profile, or history. The user can be driver using an infotainment system (e.g., SYNC) interface to configure preference or the user can be a passenger connected to the controller (e.g., filtering system) via nomadic device using local Wi-Fi, Bluetooth®, etc. This system allows more than one user to be connected to the system at any given time.

In one embodiment, a DSRC message filtering system for a vehicle includes a controller that is programmed to, in response to receiving a commercial offering from a broadcasting business via a DSRC network broadcast and identifying a match between a classification associated with the business and a user-defined preferred classification associated with the vehicle, present the offering on a user device, and responsive to identifying no match between the respective classifications, prevent the display happening on specific user device.

The system for vehicle may additionally include a local WIFI hotspot that allows users within the vehicle to be connected. Users will login with credentials and will be able to configure a personal profile to filter/route specific broadcasts of their interest/preference.

The system may also additionally adapt and deliver in a specific user interface (UI) format (e.g., adaptive HMI), the filtered broadcast based on the characteristics of the user device. The system may display the user configuration upon login and request of current settings. The system may be configured to allow users to modify their preferences and filter criteria. The system may auto detect user devices and adapt the broadcast accordingly to presentation characteristics to meet display requirements of the filtered broadcast messages.

For example, a use cases includes filtering broadcasts to identify a low-cost fuel station message and provide navigation to the station. Here, the ability to route the message directly a nomadic device helps avoid distractions for the driver wherein a co-passenger may be receiving messages based on a different profile and filter, thus receiving notifications from other local businesses.

In another example, a user configures to receive fuel station advertisements by logging in to the broadcast filter system through a personal area network (PAN) within the vehicle such as a Bluetooth® or Wi-Fi network. The Wide Area Network (WAN) outside the vehicle (i.e., DSRC) Broadcast contents are filtered and routed to user device in the specific UI format of the user. That way a user may receive local fuel station broadcasts along with fuel prices and location details while another receives their filtered broadcasts. The user selects specific content based on low fuel cost. Based on the selection or criteria, the selected fuel center address/coordinates are sent to navigation system in the vehicle. The navigation system may then plot the exact location on drivers display (e.g., a SYNC system) routing the driver to the location. If the driver is the sole user in the system, the system may generate a voice activated message for driver to acknowledge and confirm. The system may automatically send the low-cost fuel center location to the navigation system to present the route on the display.

Another example is a fast food ordering use case in which the multi-user ability will help avoid distractions for the driver wherein a co-passenger can individually filter the local business advertisements. The passengers may then receive a broadcast of a fast food menu to which they may respond by placing an order and setting the navigation system to the location for pick-up. Here, the DSRC Broadcast contents are filtered and routed to passenger device in specific UI format of the user. The passenger receives local fast food center menu//pricing broadcasts along with location details. Passenger selects menu options and adds it to order basket. Passenger selects payment option and submits. Additionally, the location of fast food is input to vehicles navigation system. The navigation system may plot the exact location on drivers display (e.g., SYNC) redirecting the driver to the location. The passenger may also initiate a phone call to place the order based on his/her convenience.

Figure 2:
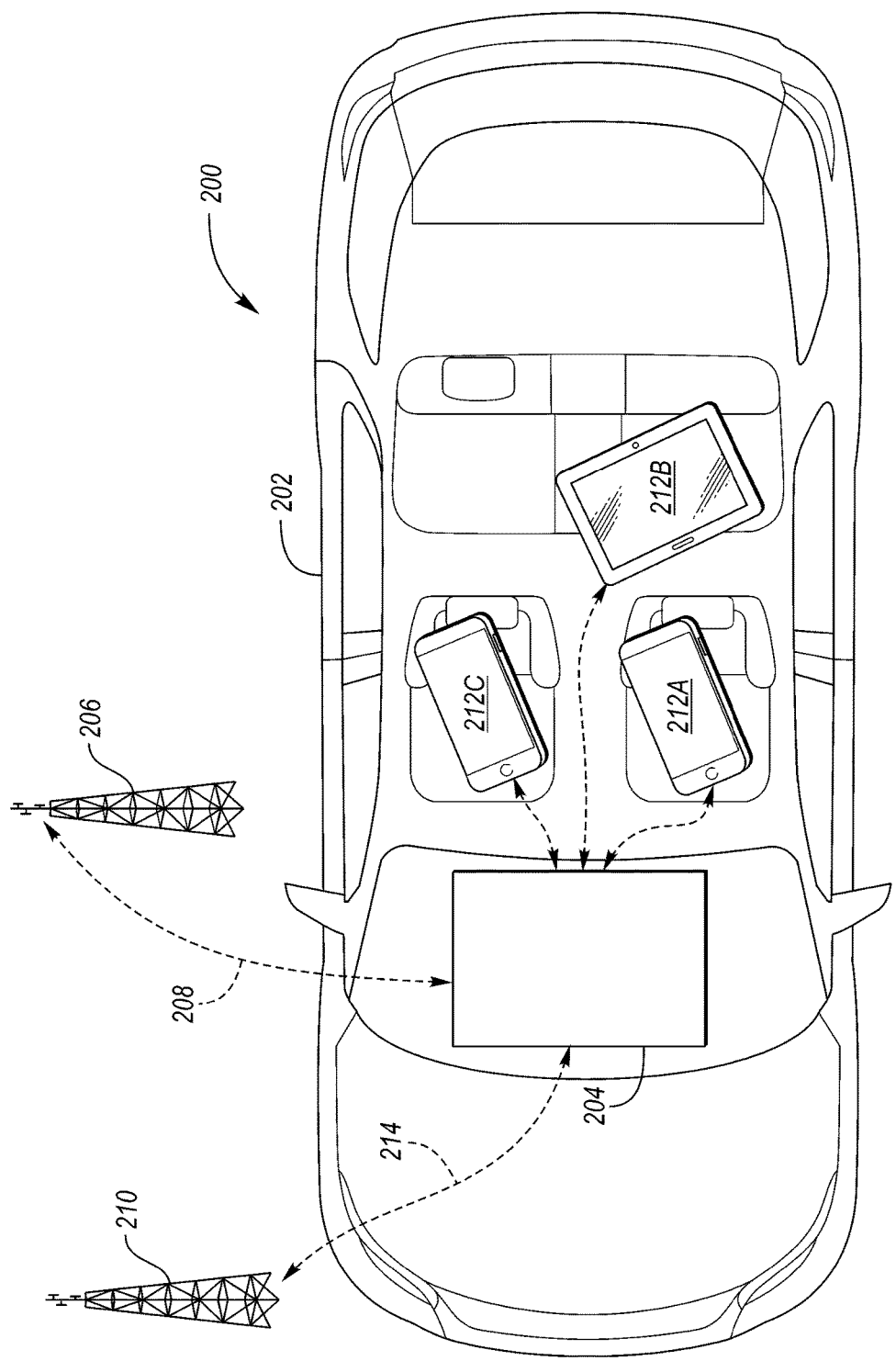
FIG. 2 is a top view of a block diagram of a communication system for a vehicle.

FIG. 2 is a block diagram of a vehicle communication system 200 for a vehicle 202. The vehicle 202 includes a controller 204 that may be include a telematics unit, gateway module, or infotainment system. The controller 204 may be configured to communicate with a cellular tower 206, other suitable structure (e.g., a building), via a cellular connection 208. The controller 204 may also be configured to communicate with another wireless tower 210 via a separate connection 214. The other tower 210 may communicate via dedicated short-range communication (DSRC) or other WAN standard. The other tower 210 is shown as an actual tower, however the tower 210 may be associated with any other suitable structure (e.g., a building), and in an ad hoc network, the tower 210 may be a transitory suitable structure (e.g., a vehicle). The controller 204 may connect with nomadic devices 212 (e.g., nomadic devices 53) such as a driver's cellular phone 212A, a rear seat passenger's wireless tablet 212B, and a front seat passenger's nomadic device 212C. The nomadic devices 212 are illustrative and may include a cellular phone, connected (e.g., Wi-Fi, cellular, Bluetooth®, IrDA®, USB, etc.) tablet, connected device (e.g., connected watch, band, necklace, earring, glasses, ring, or other accessory or item). Again, the connection may be wireless, such as Bluetooth®, Wi-Fi, inductive coupling, IrDA®, or other suitable wireless connection method, or it may be a wired connection such as via a USB port, an HDMI port, or other suitable wired connection. Upon connection, the controller 204 sends to the nomadic device 212 a request to share profile and account information and data. The sharing may be automatic or may require confirmation and authorization. The nomadic device 212 may then display the request expecting a confirmation of sharing or a decline response. If a decline of sharing or no response is received, the controller 204 may load a general profile. The general profile may include a restaurant, a fuel station, a convenience store, a coffee shop, a pharmacy, an emergency medical location, a police station, or an entertainment venue. The controller 204 may filter the broadcast via an individual profile or the general profile.

For example, the driver cell phone 212A includes browser history of searching for a coffee shop, the rear seat passenger's tablet includes browser history of searching for Happy Meal® toys from McDonald's®, while the front seat passenger's nomadic device 212C includes a McDonald's® application that is indictive of recent purchases for an Egg McMuffin®. Here, the controller 204 may, upon receiving a notification that a McDonald's® restaurant is nearby, transmit to the McDonald's®, data indictive of a request to purchase a McMuffin®, Happy Meal®, and Coffee. The controller may then receive a response with specific broadcasts associated with each profile and the controller 204 may then route each specific broadcast to the associated destination. The driver's cellular phone 212A may receive a banner of a McDonald's® coffee, the rear seat passenger's wireless tablet 212B may receive a banner of a Happy Meal®, the front seat passenger's nomadic device 212C may receive a banner of a McMuffin®, and the in-vehicle infotainment system may receive data indictive of a banner and information to generate a route to guide the vehicle to the location. If the banner is selected, the controller may input the location as a destination or a stop along a route, thus guiding the vehicle to the location.

Also, the controller 204 may present the broadcast on an in-vehicle display based on an individual profile, a general profile, a vehicle profile, or a combination thereof. The vehicle profile may include data identifying a restaurant, a fuel station, a convenience store, a coffee shop, a vehicle service center, etc. For example, a first driver of a vehicle may wait to refuel the vehicle until the fuel low warning light illuminates, while a second driver of the vehicle refuels the vehicle when the fuel gauge is between ¼ and ½. The controller 204 may identify the current driver as the first driver and modify the profile to present fuel station broadcasts responsive to the fuel gauge dropping below ¼, while if the controller 204 identifies the current driver as the second driver, the controller 204 may modify the profile to present fuel station broadcasts responsive to the fuel gauge dropping below ½. Further, the controller may receive a broadcast from a fuel station and route the broadcast to the navigation system to plot a route to the location.

Figure 3:
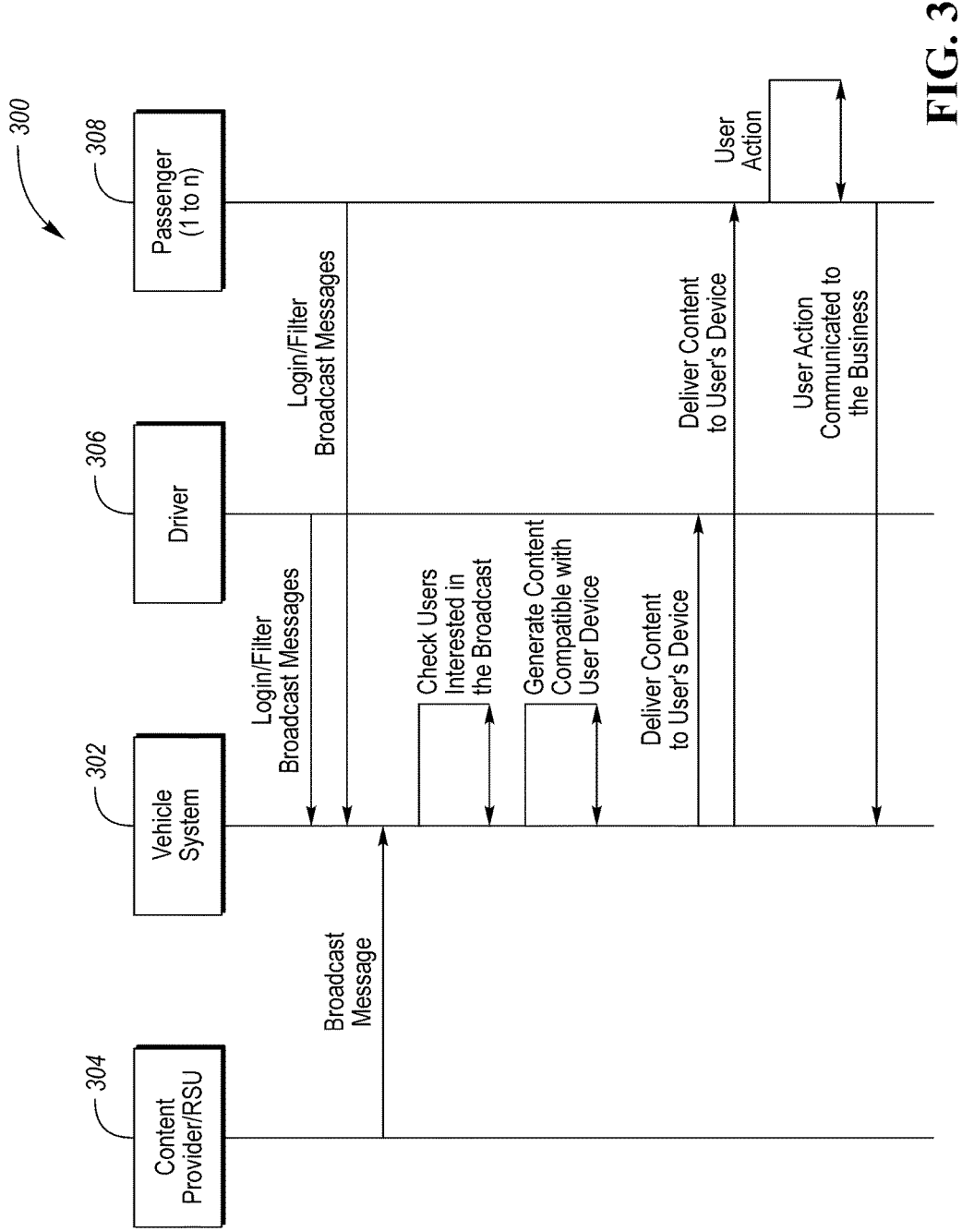
FIG. 3 is flow diagram of handshaking between a vehicle and a nomadic device to transfer a broadcast message to the vehicle system or nomadic device.

FIG. 3 is flow diagram 300 of handshaking between a vehicle 202 and a nomadic device 212 to transfer a broadcast message to the vehicle system or nomadic device. A vehicle system 302 may have, already stored in memory, a profile of a driver 306 of the vehicle based on an association with a key-fob, a seat preset, a seat position, or other occupant detection method. The profile may also be responsive to a login to the vehicle system 302 and entering profile data or downloading of data from a nomadic device (e.g., 212A) via a connection over a personal area network (PAN).

Likewise, the vehicle system 302 may have a profile of a passenger 308 of the vehicle based on an association with a seat position or other occupant detection method along with a login to the vehicle system 302 and entering profile data or downloading of data from a nomadic device (e.g., 212B or 212C) via a connection over the personal area network (PAN). The vehicle system may then receive a broadcast from a content provider, road side unit (RSU), or other vehicle. The controller 302 may then filter the broadcast based on the profile. When a match is identified, the controller may transmit the broadcast to the matching nomadic device, or the controller may present the broadcast on a display of the vehicle.

Figure 4:
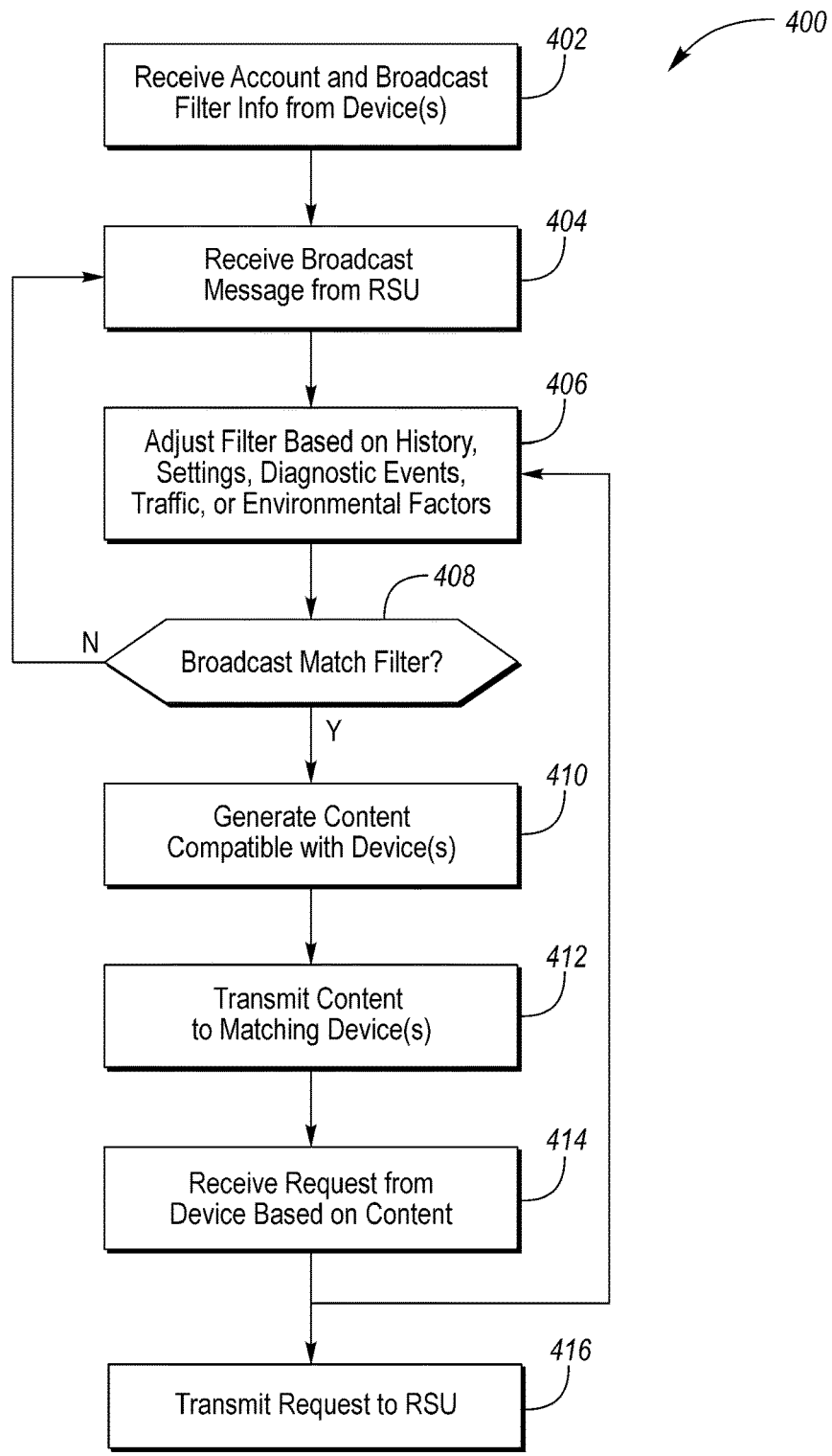
FIG. 4 is flow diagram of a vehicle system to filter a broadcast message and re-transmit the message to a nomadic device.

FIG. 4 is flow diagram 400 of a vehicle system (e.g., vehicle system 302) to filter a broadcast message and re-transmit the message to a nomadic device (e.g., nomadic device 212 or 53). In operation 402, a controller receives a profile from a nomadic device over a personal area network (PAN). The profile may include account information and broadcast filter information. The controller may also receive the profile from an in-vehicle system. In operation 404, the controller receives a broadcast over a WAN such as a road side unit (RSU).

In operation 406, the controller adjusts the profile based on a history (e.g., web browser history, or past filter history), vehicle diagnostic events (e.g., low fuel, low oil, low windshield washer fluid), traffic, or environmental factors.

In operation 408, the controller branches based on characteristics of the broadcast matching the profile. If the broadcast characteristics do not match the profile, the controller will branch to operation 404. If the broadcast characteristics match the profile, the controller will branch to operation 410.

In operation 410, the controller will modify the broadcast such that the content of the broadcast is in a form (e.g., user interface (UI)) to match the nomadic device display such that the content of the broadcast may be presented on the nomadic device. In operation 412, the controller sends, via the PAN, the modified content to the device to be displayed. In operation 414, the controller receives, via the PAN, a command or data from the nomadic device based on the content. The command or data may include a desire to visit the location, an acceptance of an offer, placing an order, etc. In operation 416, the controller transmits, via the WAN, the request to the RSU.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller configured to
establish an ad-hoc network connection according to a first standard and a personal area network (PAN) connection with a nomadic device according to a second standard different than the first standard; and
responsive to a topic of a broadcast received over the ad-hoc connection matching a profile defined according to internet browser history of the nomadic device, transfer the broadcast to the nomadic device via the PAN connection.

2. The vehicle of claim 1, wherein the controller is further configured to:
establish a connection with a second nomadic device according to a third standard, different than the first and second standards; and
responsive to the matching, route the broadcast to the nomadic device and inhibit transfer of the broadcast to the second nomadic device.

3. The vehicle of claim 2, wherein transferring the broadcast includes structuring content of the broadcast as a notification to be displayed on the nomadic device.

4. The vehicle of claim 1, wherein the first standard is Dedicated Short Range Communication (DSRC).

5. The vehicle of claim 1, wherein the nomadic device is a cellular phone, a tablet, a smart watch, or a wireless connected accessory.

6. The vehicle of claim 1, wherein the profile is defined according to social media history of the nomadic device.

7. The vehicle of claim 1, wherein the first standard is IEEE 802.11p.

8. The vehicle of claim 1, wherein the PAN connection is Bluetooth®, Wi-Fi, WiMax™, near-field communication (NFC), inductive coupling, or universal serial bus (USB).

9. A computer-implemented method for a vehicle, comprising:
establishing a first connection in an ad hoc network according to a first standard and a second connection with a nomadic device in a local area network according to a second standard, different than the first; and
responsive to a match of a broadcast received over the first connection and a profile based on internet browser history of the nomadic device, routing the broadcast to the nomadic device.

10. The method of claim 9 further comprising:
establishing a connection with a second nomadic device according to a third standard, different than the first and second standard; and
responsive to the match, routing the broadcast to the nomadic device and inhibiting transfer of the broadcast to the second nomadic device.

11. The method of claim 10, wherein routing the broadcast includes structuring content of the broadcast as a notification to be displayed on the nomadic device.

12. The method of claim 9, wherein the first standard is Dedicated Short Range Communication (DSRC).

13. The method of claim 9, wherein the nomadic device is a cellular phone, a tablet, a smart watch, or a wireless connected accessory.

14. The method of claim 9, wherein the profile is further defined according to social media history of the nomadic device.

15. The method of claim 9, wherein the second connection is Bluetooth®, Wi-Fi, WiMax™, near-field communication (NFC), inductive coupling, or universal serial bus (USB).

16. A vehicle comprising:
a controller configured to:
establish an ad-hoc network connection according to a first standard and a local area network (LAN) connection with a nomadic device according to a second standard, different than the first; and
responsive to a topic of a broadcast received over the ad-hoc connection matching a profile based on internet browser history of the nomadic device, display the broadcast in the vehicle and to the nomadic device via the LAN connection.

17. The vehicle of claim 16, wherein the profile is adjusted according to an edge analytical model.

18. The vehicle of claim 17, wherein the edge analytical model is based on data indicative of historical locations and preferences at a time of day and day of the week.

19. The vehicle of claim 16, wherein the profile is further defined according to social media history of the nomadic device.

* * * * *